Nov. 14, 1950     W. E. JOHNSTON     2,529,501
REEL FOR MOTION-PICTURE FILM AND THE LIKE
Filed April 2, 1947
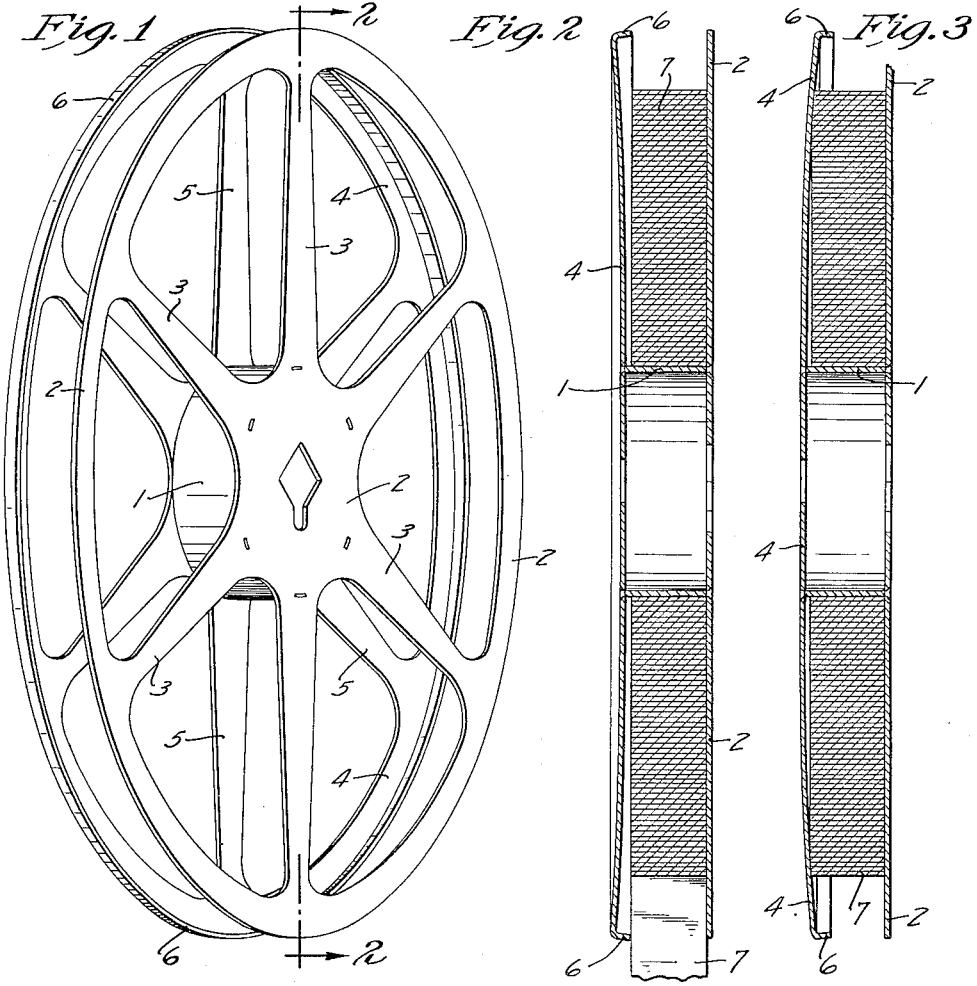
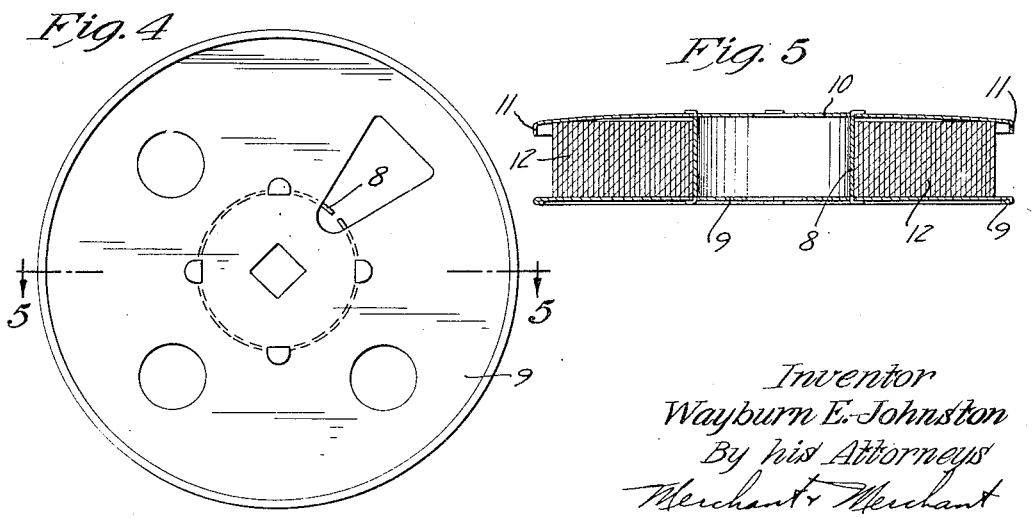
Inventor
Wayburn E. Johnston
By his Attorneys
Merchant & Merchant Patented Nov. 14, 1950

2,529,501

UNITED STATES PATENT OFFICE 2,529,501

REEL FOR MOTION-PICTURE FILM AND THE LIKE

Wayburn E. Johnston, Minneapolis, Minn.

Application April 2, 1947, Serial No. 738,778

8 Claims. (Cl. 242—70)

My invention relates to spools or reels for the winding of non-adhesive resilient strips such as motion picture film.

In the winding of motion picture film, particularly processed or developed film, for shipment or storage, there is always a problem of anchoring the extreme outer end of the film so that it will not loosen and unwind. This is true because the film is resilient and, therefore, has a tendency to straighten out. Rubber bands, spring clips, and adhesive tape are most commonly used for this purpose. Even spools or winding reels having inwardly concave confining heads, the peripheral portions of which (being spaced apart a distance slightly less than the width of the film) frictionally engage the opposite edges of the outer end of the film, have been used for this purpose. However, winding spools of this type have definite limitations due to the fact that they constantly exert pressure on opposite edges of the film as it is being reeled and unreeled therefrom; hence, they could not be used for protection or other analogous purposes.

The primary object of my invention is the provision of an all-purpose reel for the winding of motion picture film and the like—more specifically, a winding spool having a concave confining flange or head formed from resilient sheet material which is of such a diameter with respect to the thickness of the material from which it is formed, that it is capable of being snapped back-and-forth from an inwardly concave position to an outwardly concave position—and capable of retaining itself in either of said positions. Obviously, when the concave flange or dished head of such a winding reel or spool is snapped to an inwardly concave position, the radially outer portions thereof will exert a frictional grip upon the outer convolutions of the film wound between the opposed faces of the reel heads. Likewise, when the same flange or head is snapped to an outwardly concave position, it will be spaced from the film which is wound between the inner face thereof and the opposite head, thus leaving the film free for projection and the like.

The above and still further objects and advantages of my invention will become apparent from the following detailed specification, appended claims, and attached drawings.

Referring to the drawings wherein like characters indicate like parts throughout the several views:

Fig. 1 is a perspective view showing a motion picture reel incorporating my invention;

Fig. 2 is a transverse section, taken on the line 2—2 of Fig. 1;

Fig. 3 is a view corresponding to Fig. 2, but showing a different position of some of the parts;

Fig. 4 is a side elevation of a slightly different type of motion picture film reel; and Fig. 5 is a transverse section, taken on the line 5—5 of Fig. 4.

Referring with greater particularity to the drawings, the numeral 1 indicates a hub or core, preferably cylindrical in form and having the conventional notch (not shown) for insertion of the inner end of the film. A relatively flat confining head or flange 2 is secured to one end of the hub 1 so that the side edges thereof project radially outwardly therefrom. The flange 2 may be formed from any suitable sheet material and may be or may not be cut away to provide spokes or the like 3.

A relatively resilient, cross-sectionally concave or dished flange or head 4 is secured to the opposite end of the hub 1 by any suitable means and is of approximately the same size as the oppose flange or head 2. The dished head 4 is formed preferably from resilient sheet metal and must be of a thickness with respect to its size or diameter, whereby it is capable of being snapped from the inwardly concave position of Fig. 3 to the outwardly concave position of Fig. 2. Obviously, the smaller the size or diameter of the flange 4, the thinner the material from which it must be formed, in order to give it the necessary deflectable characteristics. While the flanges 2 and 4 may take numerous shapes, they are preferably circular in shape and the flange 4 thereof may be preferably cut away to provide spokes 5. Furthermore, the flange 4 may, if desired, be provided at its periphery with an axially inwardly-projecting peripheral lip or rim 6.

When it is desired to wind motion picture film, indicated by the numeral 7, upon, or to unwind the same from my novel spool, it is only necessary to move the rim 6 of the head 4 axially relative to the head 2 to thereby flex and snap the resilient dished web portion of the head or flange 4 to the outwardly concave position indicated in Fig. 2. In this figure it will be seen, that the side of the head 4 is now spaced from the film 7 so that it will not exert any frictional pressure thereon. Furthermore, it will be observed that the depth of the lip 6 is such that the space from the outer edge thereof to the opposite flange 2 is slightly greater than the normal width of the film to be received, between the flanges 2 and 4, thereby providing ample clearance.

On the other hand, when, after winding, it is desired to ship or store processed motion picture film or the like on my novel reel, it is but necessary to exert slight axial pressure on the side or preferably the rim portion of the flexible resilient head 4, so as to snap the same from the outwardly concave position of Fig. 2 to the inwardly concave position of Fig. 3—in which latter position the radially outer portions of the web of the head 4 will exert axial pressure against the adjacent side edge of the film 7, thereby squeezing the film 7 against the opposite flange or head 2, so as to prevent it from unwinding. The peripheral lip 6 operates to guide the film 7 toward the flange 2 when the film 7 is being wound upon the reel and further serves as an additional safeguard to prevent the film 7 from unwinding when the flange 4 is snapped to its inwardly concave position of Fig. 3.

The reel illustrated in Figs. 1, 2, and 3 is of the type generally used on motion picture projectors and the like. However, my novel invention may be applied to reels on which film is wound for shipment, such as illustrated in the modified form shown in Figs. 4 and 5. This type of reel comprises an axially-extended hub or core 8 having secured to one end thereof a relatively rigid flange or head 9 and at the other end thereof a relatively resilient flange or head 10. The head 10 is provided with an axially inwardly-extended peripheral flange or rim 11; and a length of motion picture film, indicated by the numeral 12, is shown as being wound about the hub 8 between the heads 9 and 10.

My device has been thoroughly tested and found to be entirely satisfactory for the accomplishment of the above purposes and objects.

I claim:

1. In a device of the class described, a hub to receive winding material, spaced, radially-projecting, confining members on said hub, one of said confining members being in the nature of a cross-sectionally concave resilient head capable of being snapped back-and-forth between inwardly concave and outwardly concave positions so as to engage and disengage respectively the outer convolutions of the winding material and retaining itself in either of said positions.

2. The structure as defined in claim 1, in which said head is circular and is provided at its periphery with an axially inwardly-projecting peripheral lip.

3. In a spool for winding strips of photographic film, a hub, spaced, radially-extending circular flanges on said hub, one of said flanges being in the nature of a concave head formed from resilient sheet material, said head being capable of being snapped back and forth between inwardly concave and outwardly concave positions so as to engage and disengage respectively the outer convolutions of the film and retaining itself in either of said positions relative to the other head.

4. The structure defined in claim 3 in which said head is provided with an axially inwardly-projecting peripheral lip.

5. In a device of the class described, a hub to receive winding material, a pair of spaced radially-projecting confining flanges on said hub, one of said flanges being cross-sectionally concave, said concave flange being formed from resilient sheet metal of a thickness, with relation to its diameter, to permit the same to be snapped back-and-forth between inwardly concave and outwardly concave positions so as to engage and disengage respectively the outer convolutions of the winding material, and to retain itself in either of said positions.

6. A film spool comprising a hub having axially spaced heads secured thereon, one of said heads having a relatively stiff rim and a dished and relatively flexible and resilient area intermediate the rim and said hub, whereby the rim may be snapped from one limit of movement adjacent the other head to another limit of movement remote from said other head on reverse flexing of said intermediate area, and the portion of the head adjacent the rim will be moved respectively into and out of binding contact with the outer convolutions of the film.

7. A film spool comprising a hub having axially spaced disk shaped heads secured thereon, one of said heads having a rim providing therewith a film binding portion, and a dished resilient and highly flexible web portion connecting said rim with the hub and biasing said rim in inturned or outturned positions relative to the other head, whereby the portion of said one head adjacent the rim may be moved respectively into and out of the binding contact with the outer convolutions of the film.

8. The structure according to claim 7, wherein the rim of said one head is circular and axially inturned to provide a film guiding surface in one biased position of the head.

WAYBURN E. JOHNSTON.

REFERENCES CITED

The following references are of record in the file of this patent:

UNITED STATES PATENTS

| Number | Name | Date |
|---|---|---|
| 2,015,860 | May | Oct. 1, 1935 |
| 2,301,920 | Sadler | Nov. 17, 1942 |

FOREIGN PATENTS

| Number | Country | Date |
|---|---|---|
| 16,185 | Great Britain | Sept. 23, 1891 |